US011794657B2

(12) United States Patent
Johansson et al.

(10) Patent No.: US 11,794,657 B2
(45) Date of Patent: Oct. 24, 2023

(54) FOLDABLE VEHICLE CAGE SYSTEM

(71) Applicant: Ningbo Geely Automobile Research & Development Co., Ltd., Ningbo (CN)

(72) Inventors: Jonathan Johansson, Gothenburg (SE); Albin Hagström, Lödöse (SE)

(73) Assignee: Ningbo Geely Automobile Research & Development Co., Ningbo (CN)

( * ) Notice: Subject to any disclaimer, the term of this patent is extended or adjusted under 35 U.S.C. 154(b) by 35 days.

(21) Appl. No.: 17/496,278

(22) Filed: Oct. 7, 2021

(65) Prior Publication Data

US 2022/0024386 A1 Jan. 27, 2022

Related U.S. Application Data

(63) Continuation of application No. PCT/CN2020/084236, filed on Apr. 10, 2020.

(30) Foreign Application Priority Data

Apr. 17, 2019 (EP) .................................... 19169781

(51) Int. Cl.
*B60R 7/00* (2006.01)
*B60R 5/04* (2006.01)
*B60R 7/02* (2006.01)

(52) U.S. Cl.
CPC .............. *B60R 7/005* (2013.01); *B60R 5/047* (2013.01); *B60R 7/02* (2013.01)

(58) Field of Classification Search
CPC ... B60R 5/047; B60R 5/04; B60R 2011/0036; B60R 2011/0082; B60P 7/0876

(Continued)

(56) References Cited

U.S. PATENT DOCUMENTS 5,207,260 A * 5/1993 Commesso .......... B61D 45/006
296/37.16
6,183,177 B1 * 2/2001 Dahlgren .................. B60R 7/02
410/117

(Continued)

FOREIGN PATENT DOCUMENTS

CN 107097724 A * 8/2017
CN 207449780 U 6/2018

(Continued)

OTHER PUBLICATIONS

Machine translation of DE-102004036770-A1.*
International Search Report from corresponding International Application No. PCT/CN2020/084236, dated Jun. 29, 2020, 3 pages.

*Primary Examiner* — Dennis H Pedder
*Assistant Examiner* — Kevin P Weldon
(74) *Attorney, Agent, or Firm* — TUCKER ELLIS LLP

(57) ABSTRACT

A foldable vehicle cage system arranged for sectioning an interior vehicle luggage compartment, wherein the cage system includes a cage post, an elongated guide member, and a net structure, wherein the net structure is connected to the cage post, a first end of the cage post is slidingly and hingedly connected to the elongated guide member, and the elongated guide member is configured to be connected to a first vehicle interior structure, wherein the cage post and the net structure are movably arranged in relation to the elongated guide member between a storage position and an in-use position, wherein a second end of the cage post in the in-use position is configured to be attached to a second vehicle interior structure.

21 Claims, 15 Drawing Sheets

(58) Field of Classification Search
USPC .................. 296/37.16, 24.4, 186.4; 410/105
See application file for complete search history.

(56) References Cited

U.S. PATENT DOCUMENTS

| | | | | |
|---|---|---|---|---|
| 7,207,613 | B2* | 4/2007 | Walter | .................... B60R 21/06 |
| | | | | 296/37.16 |
| 7,665,790 | B2* | 2/2010 | Oino | ........................ B60R 7/02 |
| | | | | 296/37.16 |
| 2009/0195006 | A1 | 8/2009 | Lim | |
| 2010/0178129 | A1* | 7/2010 | Helmner | ................. B64D 9/00 |
| | | | | 410/118 |
| 2010/0301626 | A1 | 12/2010 | Reid | |
| 2012/0261935 | A1 | 10/2012 | Perez | |
| 2014/0015270 | A1* | 1/2014 | Staib | ....................... B60R 5/047 |
| | | | | 296/37.16 |
| 2018/0009303 | A1* | 1/2018 | Romero Regalado | .. B60R 16/03 |

FOREIGN PATENT DOCUMENTS

| | | | | |
|---|---|---|---|---|
| CN | 208264121 | U | 12/2018 | |
| CN | 208559196 | U | 3/2019 | |
| DE | 20206367 | U1 | 8/2002 | |
| DE | 10134887 | A1 | 2/2003 | |
| DE | 10357153 | A1 | 7/2005 | |
| DE | 102004036770 | A1 * | 3/2006 | ............... B60R 5/04 |
| DE | 102016101068 | A1 * | 7/2016 | ............... B60P 7/14 |
| EP | 1088703 | A2 * | 4/2001 | ............. B60R 21/06 |
| EP | 1736364 | A1 | 12/2006 | |
| FR | 2942181 | A3 | 8/2010 | |
| GB | 2465668 | A1 | 6/2010 | |
| GB | 2469682 | A * | 10/2010 | ............. B60R 5/047 |
| KR | 100831477 | B1 * | 5/2008 | |
| KR | 100950940 | B1 * | 4/2010 | |
| WO | WO-0121436 | A1 * | 3/2001 | ................ B60P 7/08 |

* cited by examiner

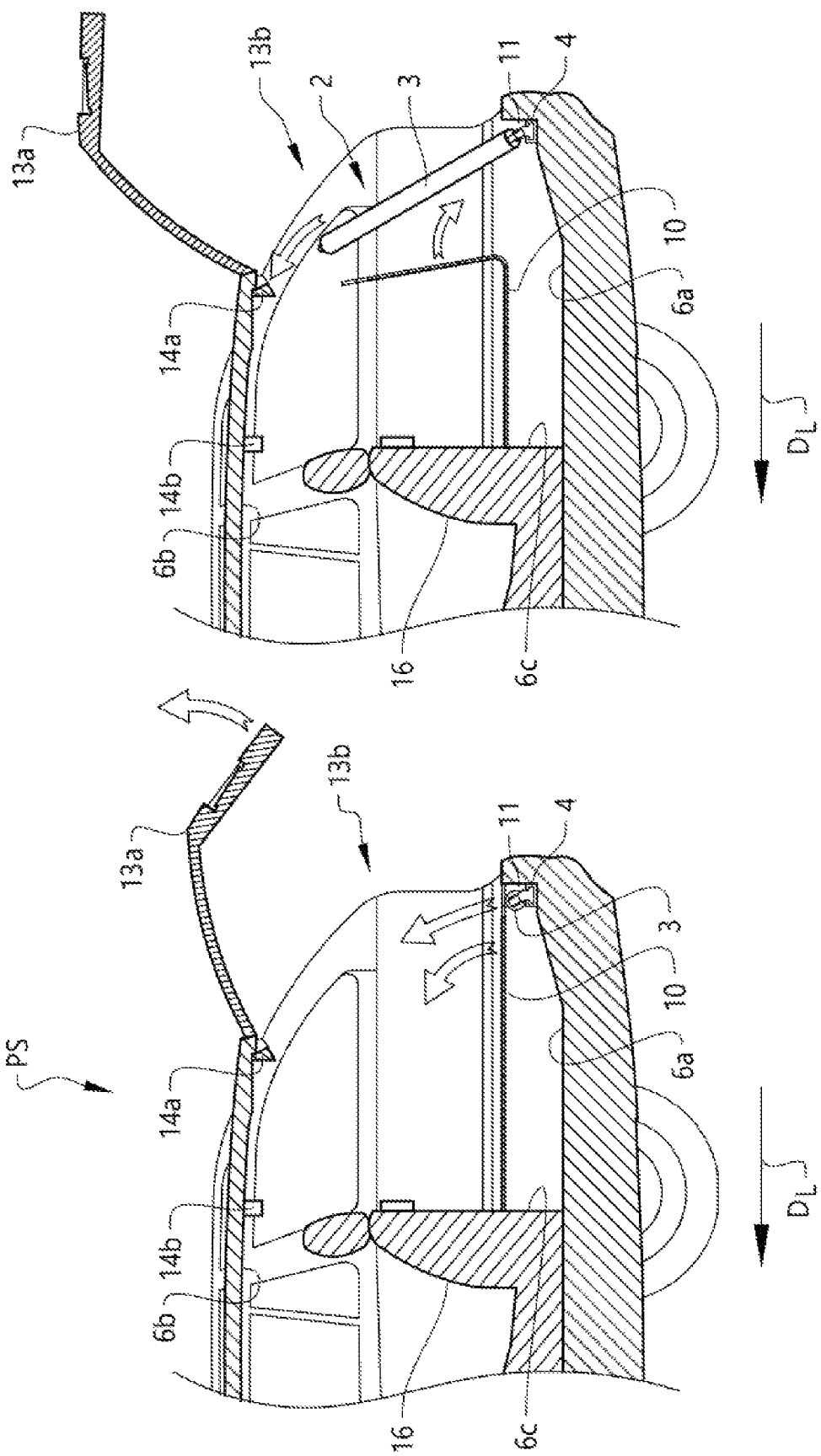

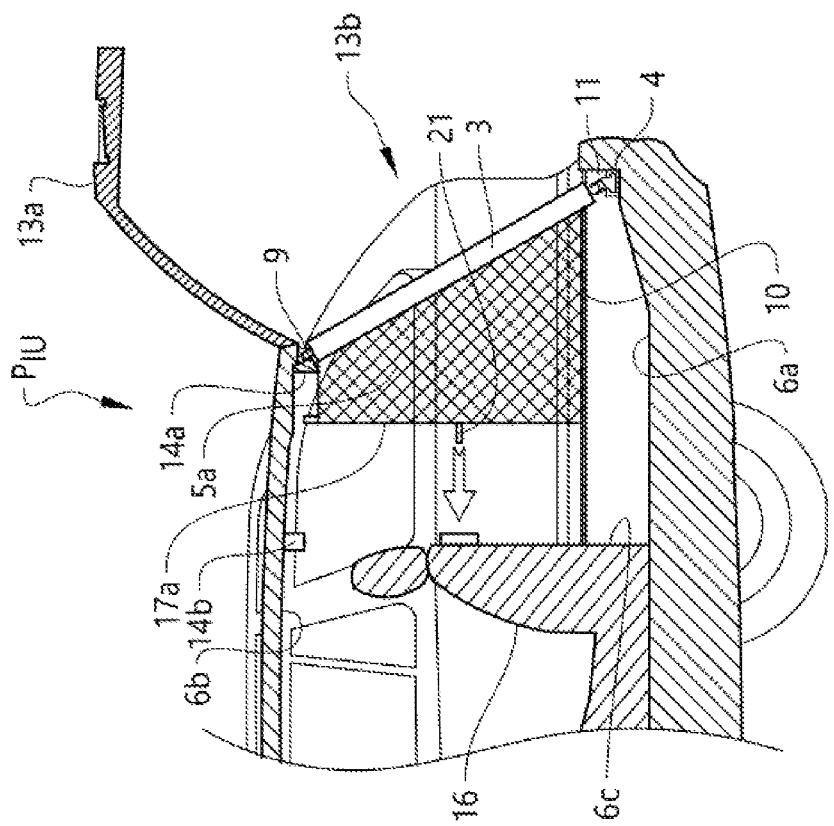
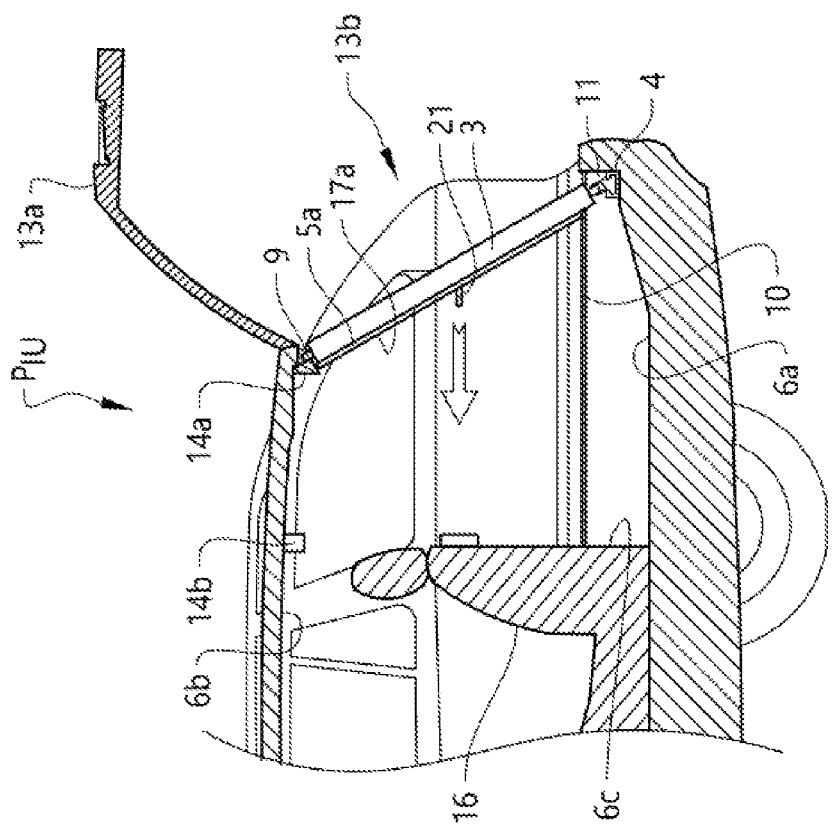
Fig. 5C
Fig. 5D

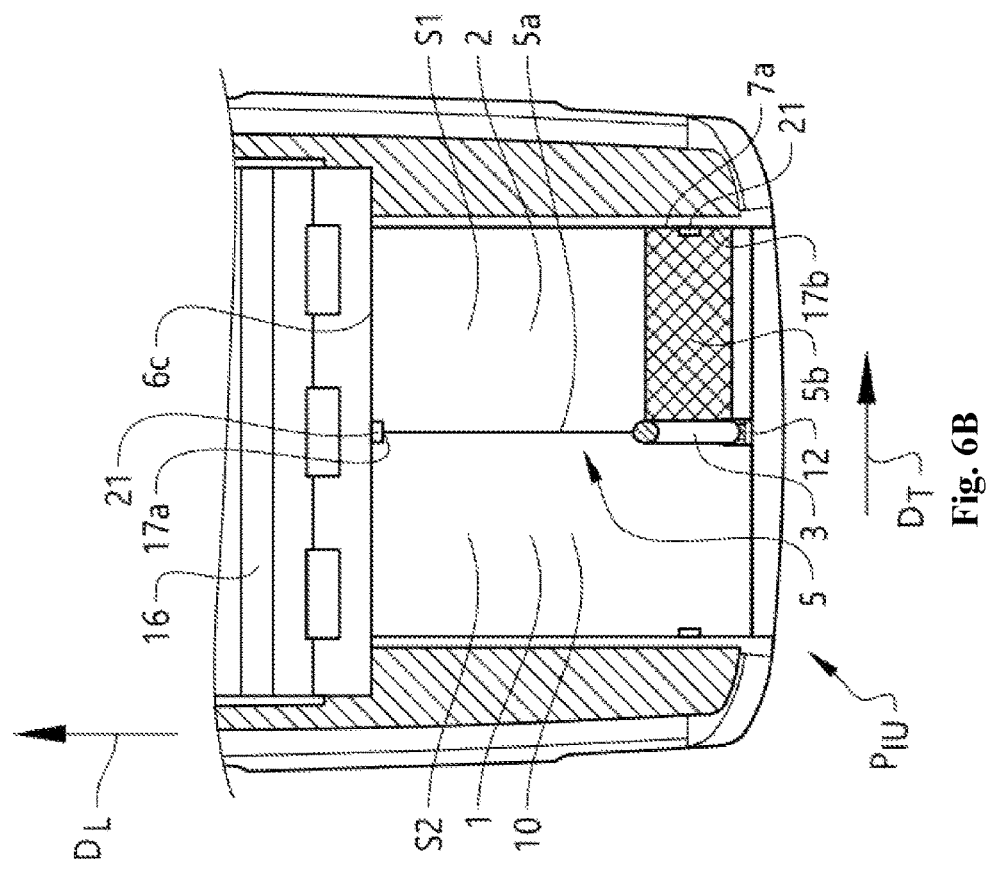
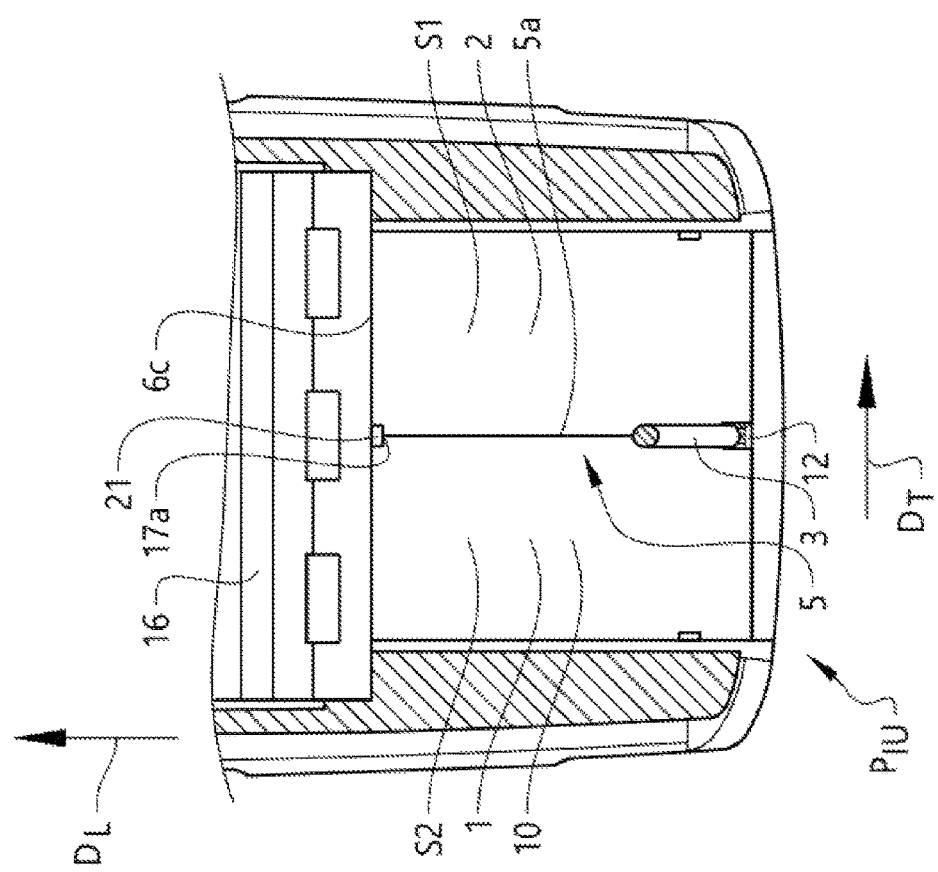
Fig. 6A
Fig. 6B

FOLDABLE VEHICLE CAGE SYSTEM

RELATED APPLICATION DATA

This application is a continuation of International Patent Application No. PCT/CN2020/084236, filed Apr. 10, 2020, which claims the benefit of European Patent Application No. 19169781.2, filed Apr. 17, 2019, the disclosures of which are incorporated herein by reference in their entireties.

TECHNICAL FIELD

The present disclosure relates to a foldable vehicle cage system arranged for sectioning an interior vehicle luggage compartment. The disclosure further relates to a vehicle comprising a foldable vehicle cage system.

BACKGROUND

Vehicle cage systems are commonly used for sectioning an interior vehicle luggage compartment when there is a need to divide the luggage compartment into two or more sections. This is for example suitable when transporting goods or pets, such as dogs or cats, in the luggage compartment for increased safety during transport.

In today's vehicle applications, there is often a possibility to separate the luggage compartment from the passenger compartment in the vehicle with a net or grid structure preventing a pet or goods from entering the passenger compartment in a crash event. When there is a need for sectioning the luggage compartment, pet cages or similar sectioning arrangements are used for securing safe transportations. Pet cages or such similar structures are commonly designed as rigid constructions that are installed permanently or removably in the luggage compartment area. Even if pet cages or other cage structures are installed as removable systems, they are often heavy, complex and time consuming to attach to and remove from the vehicle.

There is thus a need for an improved vehicle cage system that is efficiently sectioning the luggage compartment, where the system is lightweight in construction, simple to attach to and remove from the vehicle luggage compartment, and further has a simple construction.

SUMMARY

An object of the present disclosure is to provide a foldable vehicle cage system and a vehicle comprising such a system where the previously mentioned problems are avoided. This object is at least partly achieved by the features of the independent claims. The dependent claims contain further developments of the foldable vehicle cage system.

The disclosure concerns a foldable vehicle cage system arranged for sectioning an interior vehicle luggage compartment. The cage system comprises a cage post, an elongated guide member, and a net structure. The net structure is connected to the cage post, where a first end of the cage post is slidingly and hingedly connected to the elongated guide member, and the elongated guide member is configured to be connected to a first vehicle interior structure. The cage post and the net structure are movably arranged in relation to the elongated guide member between a storage position and an in-use position. A second end of the cage post is in the in-use position configured to be attached to a second vehicle interior structure.

Advantages with these features are that with this construction of the vehicle cage system a flexible and compact solution is achieved, where the system can be constructed with low weight. Further, the system with a slidably arranged cage post is providing a solution that is simple to attach to and remove from the vehicle luggage compartment. The vehicle cage system is simple and reliable in construction, and arranged for efficiently sectioning the luggage compartment with the net structure.

According to an aspect of the disclosure, the cage post is having a single post configuration with a post structure extending between the first end and the second end. This configuration is suitable for the flexible and compact solution of the foldable vehicle cage system. The cage post can be arranged as a single structural element, such as an elongated post structure or similar structure, where the single structural element is made from one structural part or from two or more structural parts attached to each other forming the single structural element and extending between the first end and the second end. The cage post may have any suitable shape or configuration depending on the design of the foldable vehicle cage system. The cage post is in the in-use position extending between the first vehicle interior structure via the elongated guide member and the second vehicle interior structure, for an efficient arrangement of the net structure.

According to an aspect of the disclosure, the cage post is in the storage position arranged substantially in parallel with a longitudinal direction of the elongated guide member. With the parallel orientation of the cage post in relation to the elongated guide member, a simple positioning of the cage post and a compact storage of the system is achieved when not used.

According to another aspect of the disclosure, the cage post is in the in-use position arranged substantially perpendicular to a longitudinal direction of the elongated guide member. With the perpendicular orientation of the cage post in relation to the elongated guide member, the cage post is providing a suitable orientation for the net structure when used for sectioning the luggage compartment area.

According to an aspect of the disclosure, the net structure is in the in-use position configured to be arranged in an extended state, and the net structure is in the storage position configured to be arranged in a retracted state. In the extended state, the net structure is dividing the luggage compartment into sections suitable for transportation of pets or goods. In the retracted state, the net structure is arranged in a configuration suitable for compact storage.

According to another aspect of the disclosure, the net structure has an elongated shape in the retracted state. The net structure is arranged in parallel with a longitudinal direction of the cage post in the storage position. The retracted elongated shape and the parallel orientation is providing a compact arrangement of the net structure suitable for storing the cage system.

According to a further aspect of the disclosure, the net structure comprises a first net section. The first net section is in the in-use position configured to be arranged in an extended state between the cage post and a third vehicle interior structure. The first net section is in the storage position configured to be arranged in a retracted state in connection to the cage post. The first net section of the net structure is in the extended state arranged between the cage post and the third vehicle structure for sectioning the luggage compartment in an efficient and convenient way. The third vehicle structure may be any suitable interior structure of the vehicle to which a part of the first net section can be attached in the extended state.

According to an aspect of the disclosure, the first net section is in the in-use position configured to extend in a longitudinal vehicle direction between the cage post and the third vehicle interior structure. With the arrangement of the first net section in the longitudinal vehicle direction, the luggage compartment can be divided into two separate sections laterally on each side of the first net structure. Each section can be used for pets or goods, and the first net section is preventing movement of goods during transportation or in a crash event, or alternatively providing a safe and convenient transportation of pets.

According to another aspect of the disclosure, the net structure further comprises a second net section. The second net section is in the in-use position configured to extend in a transverse vehicle direction between the cage post and a first interior rear vehicle side. The second net section is in the storage position configured to be arranged in connection to the cage post. The second net section is providing a way to further secure goods or provide a safe and convenient transportation of pets. The second net section is arranged in the rear part of the vehicle and may for example be used for preventing a pet to escape from the luggage compartment when the tailgate of the vehicle is in an open position. The configuration of the second net section in connection to the cage post in the storage position is providing a compact design of the system.

According to a further aspect of the disclosure, the net structure further comprises a third net section. The third net section is in the in-use position configured to extend in a transverse vehicle direction between the cage post and a second interior rear vehicle side. The third net section is in the storage position configured to be arranged in connection to the cage post. The third net section is arranged in the rear part of the vehicle and may for example be used, in the same way as the second set section, for preventing a pet to escape from the luggage compartment when the tailgate of the vehicle is in an open position. The configuration of the third net section in connection to the cage post in the storage position is providing a compact design of the system.

According to an aspect of the disclosure, the first end of the cage post comprises a hinged connection member. The hinged connection member is connected to the elongated guide member, and the cage post is configured to pivot in relation to the elongated guide member via the hinged connection member when moving between the storage position and the in-use position. The pivoting arrangement between the cage post and the elongated guide member via the hinged connection member is providing a simple, flexible, and compact design of the system when moving the cage post between the storage position and the in-use position.

According to an aspect of the disclosure, the hinged connection member is movably connected to the elongated guide member and arranged to slide along the elongated guide member between the storage position and the in-use position. The hinged connection member is connecting the cage post and the elongated guide member, and the hinged connection member is arranged to slide along the elongated guide member for positioning the cage post. The hinged connection member is allowing the cage post to be positioned in different angles in relation to the elongated guide member, between the essentially parallel orientation in the storage position and the essentially perpendicular orientation when used.

According to another aspect of the disclosure, the hinged connection member is arranged to slide along the elongated guide member from a first end section of the elongated guide member in a direction towards a second end section of the elongated guide member when the cage post is moved from the storage position to the in-use position. The hinged connection member is arranged to slide along the elongated guide member from the second end section of the elongated guide member in a direction towards the first end section of the elongated guide member when the cage post is moved from the in-use position to the storage position. The slidingly arranged hinged connection member is thus moving along the elongated guide member between the end sections of the elongated guide member for a simple and efficient positioning of the cage post between the storage position and the in-use position.

According to a further aspect of the disclosure, the second end of the cage post comprises a connection member. The connection member is in the in-use position arranged to be attached to the second vehicle interior structure. The second vehicle interior structure is a part of the vehicle interior suitable for receiving the second end of the cage post in the in-use position, such as for example a ceiling structure to which the connection member can be attached. The ceiling structure may be arranged with a suitable receiving member for holding the connection member in position.

According to an aspect of the disclosure, the cage post is in the in-use position arranged in an upright configuration, and in the storage position arranged in a folded configuration. The upright configuration is providing a suitable positioning of the cage post when sectioning the luggage compartment in a longitudinal vehicle direction and the cage post can for example be arranged between a floor structure and a ceiling structure of the vehicle. The folded configuration is providing a compact storage position of the cage post, where the cage post can be arranged not to interfere with other luggage compartment structures or objects transported in the luggage compartment.

According to another aspect of the disclosure, the system further comprises a movable cargo floor structure. The cage post and the net structure are in the storage position arranged in a storage compartment below the movable cargo floor structure. The arrangement of the cage post and the net structure below the movable cargo floor is establishing an efficient storage position, where the cage post and the net structure are not interfering with other luggage compartment structures or objects.

According to a further aspect of the disclosure, the movable cargo floor structure comprises a recess, where the recess is configured to be arranged at least partly around the cage post and the net structure in the in-use position for preventing movement of the cage post in relation to the elongated guide member. The recess is holding the cage post in position in relation to the elongated guide member and the cargo floor structure. The recess is also providing an efficient and simple arrangement for positioning the cage post in a desired in-use position and is securing the cage post in relation to the cargo floor structure.

According to an aspect of the disclosure, the net structure is in the in-use position extending between the second vehicle interior structure and the movable cargo floor structure. With this arrangement, the net structure is efficiently sectioning the luggage compartment from the floor structure to the second vehicle interior structure, which for example is an interior ceiling structure of the vehicle. Goods is efficiently prevented from moving between the sectioned areas, and pets are prevented from moving between the different sections of the luggage compartment.

According to another aspect of the disclosure, the net structure is in the storage position at least partly arranged inside the cage post in a retracted rolled-up configuration, and is in the in-use position arranged in an extended configuration from the cage post. The arrangement of the net structure inside the cage post is securing a simple configuration of the system when stored. Further, the design can be made compact which is suitable when storing the cage post.

According to a further aspect of the disclosure, the net structure further comprises at least one net compartment attached to the cage post. The net structure is in the storage position arranged inside the at least one net compartment in a retracted rolled-up configuration, and is in the in-use position arranged in an extended configuration from the net compartment. The net compartment is providing a simple and reliable way of extending and retracting the net structure and the net compartment is further protecting the net structure in the rolled-up configuration.

According to an aspect of the disclosure, the at least one net compartment is removably attached to the cage post. The removable attachment is providing a simple and efficient way of removing the net compartment, for example, when there is a need for cleaning the net compartment or if a replacement of the net compartment is desired.

The disclosure further concerns a vehicle comprising a foldable vehicle cage system. The vehicle comprises a first vehicle interior structure, a second vehicle interior structure, and a third vehicle interior structure. The first vehicle interior structure is a luggage compartment floor structure, the second vehicle interior structure is a first interior ceiling structure, and the third vehicle interior structure is a backrest structure and/or a second interior ceiling structure.

BRIEF DESCRIPTION OF THE DRAWINGS

The disclosure will be described in greater detail in the following, with reference to the attached drawings, in which FIGS. 5A-5E show schematically in side views, the vehicle with the foldable vehicle cage system in different positions according to the disclosure, FIGS. 6A-6C show schematically in vehicle views from above, different embodiments of a net structure according to the disclosure.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
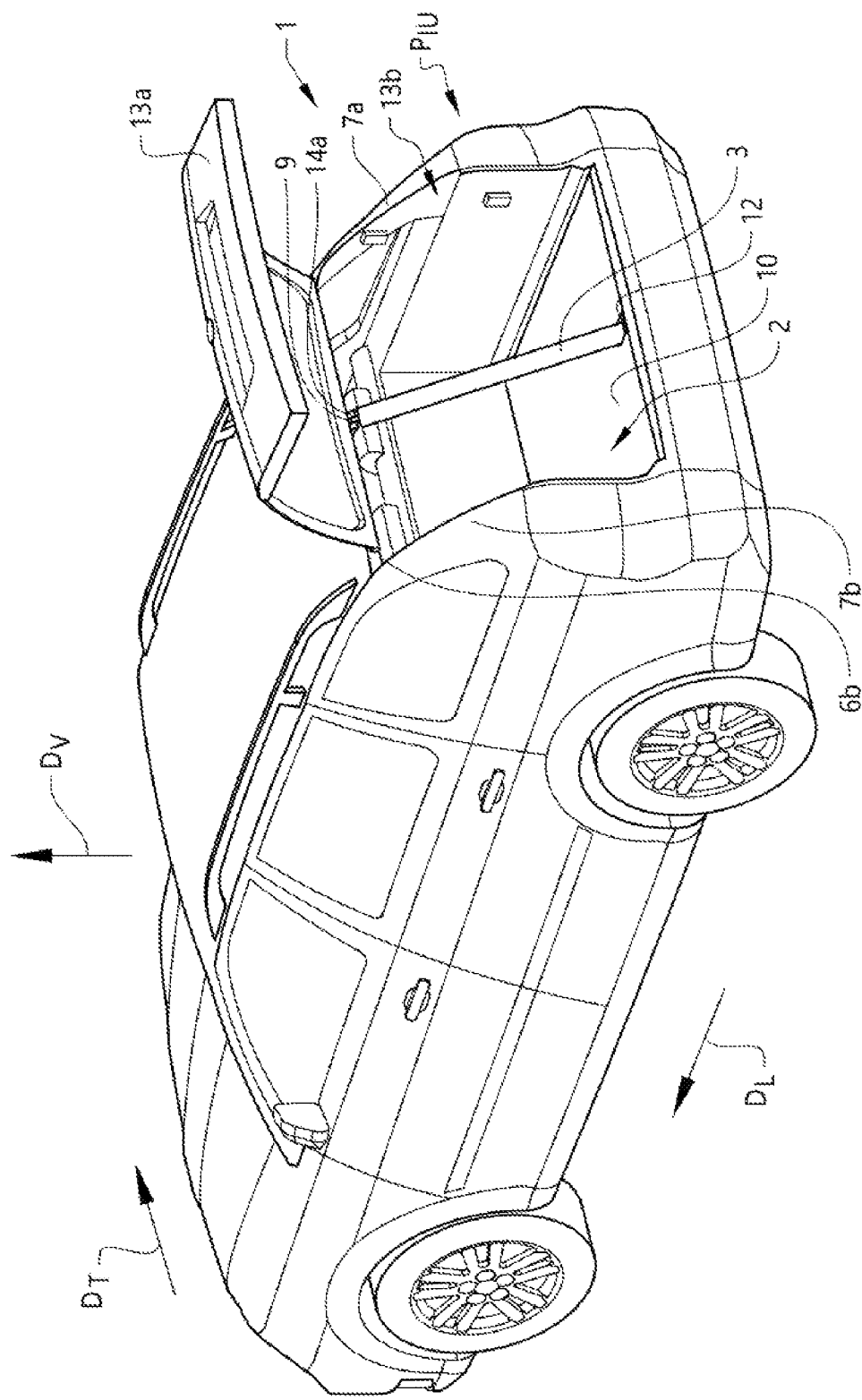
FIGS. 1A-1B show schematically in perspective views, a vehicle with a foldable vehicle cage system according to the disclosure.
Figure 1B:
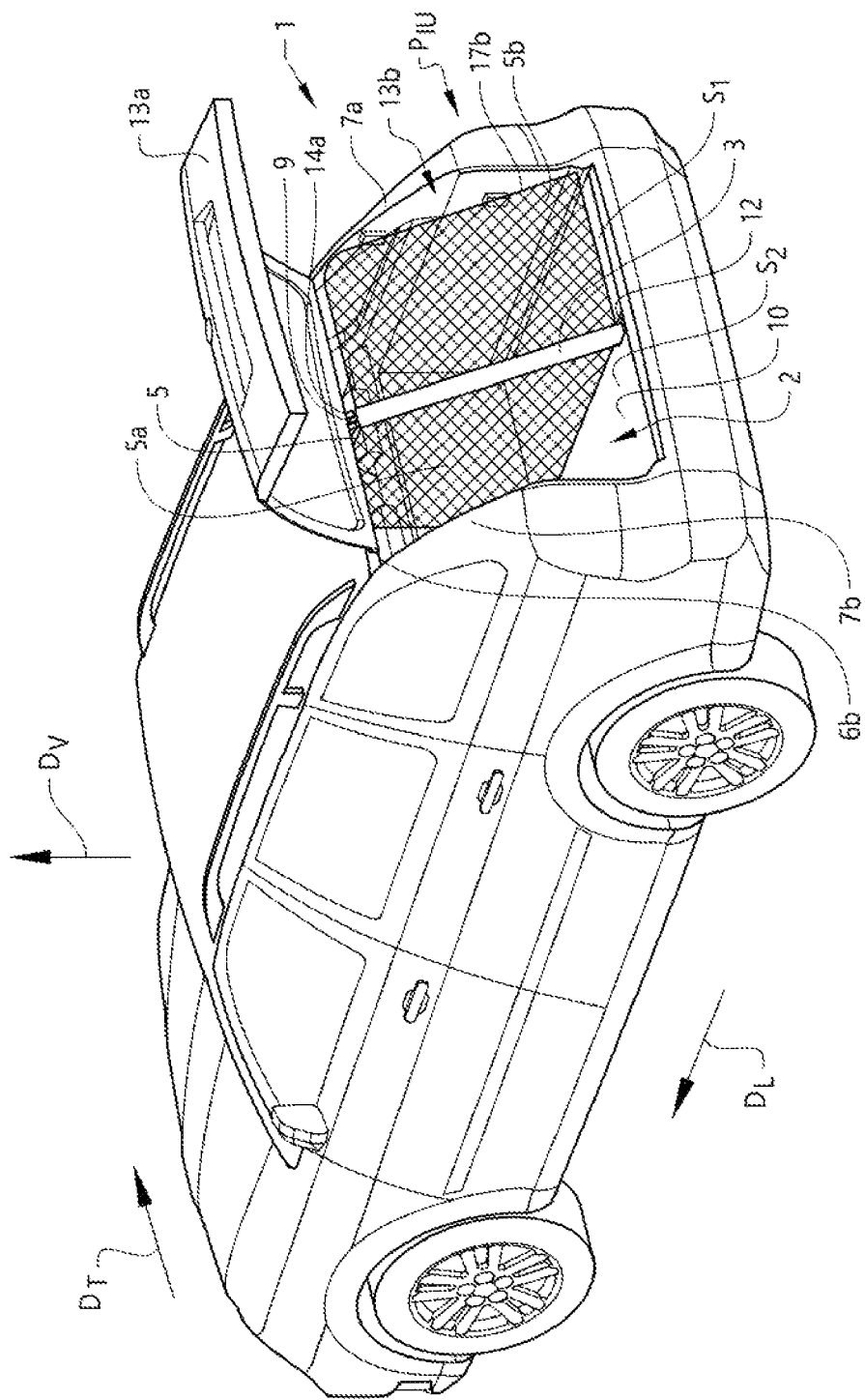

FIGS. 1A-1B schematically show a vehicle comprising a foldable vehicle cage system 1 arranged for sectioning an interior vehicle luggage compartment 2. In the embodiment shown in FIG. 1B, the luggage compartment 2 is sectioned into a first storage section S1 and a second storage section S2. The respective storage sections may be used for transporting pets or goods. The vehicle shown in FIG. 1 comprises a tailgate opening 13b for accessing the luggage compartment and a tailgate 13a. The construction and design of the luggage compartment 2 may vary depending on the design of the vehicle and the foldable vehicle cage system is suitably arranged in a SUV, station wagon, or hatchback type of vehicle. It may also be possible to arrange the foldable vehicle cage system 1 in other vehicle types, such as for example vans or sedans.

Figure 2A:
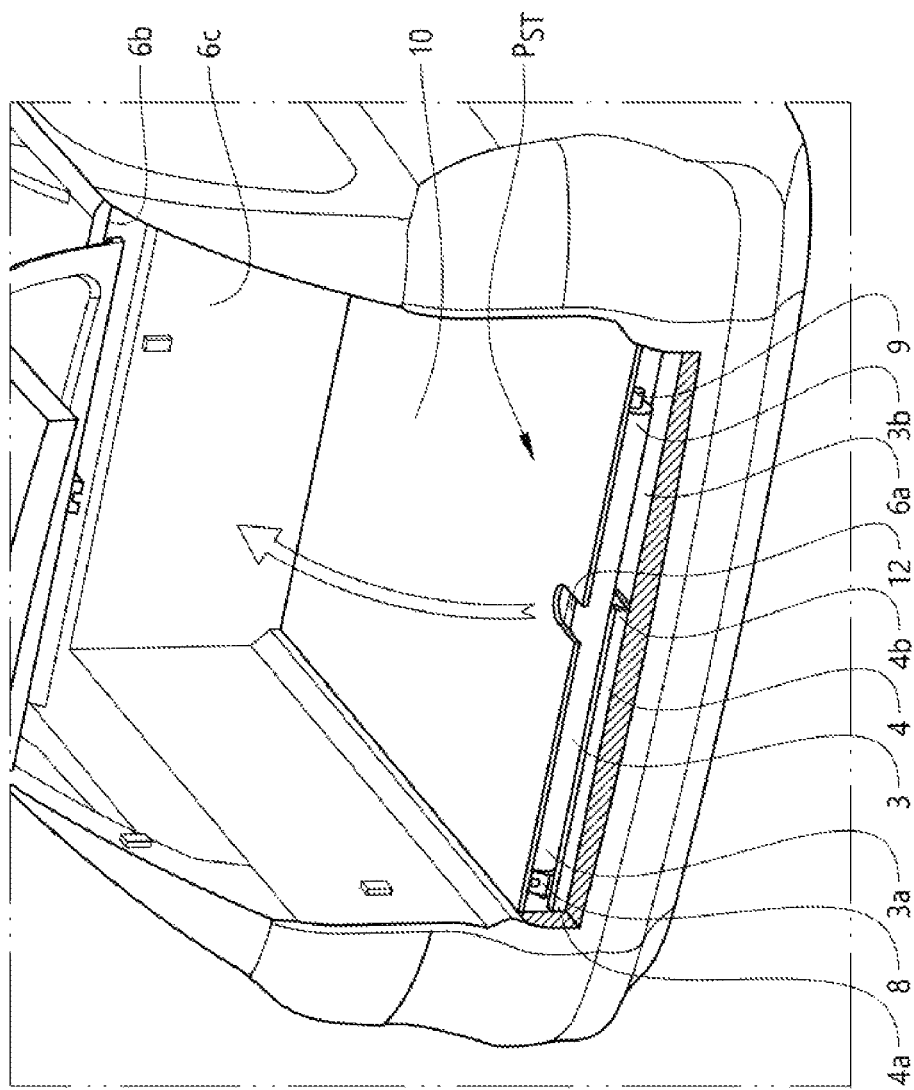
FIGS. 2A-2D show schematically in perspective views, the foldable vehicle cage system in a storage position, intermediate positions, and an in-use position according to the disclosure.
Figure 2B:
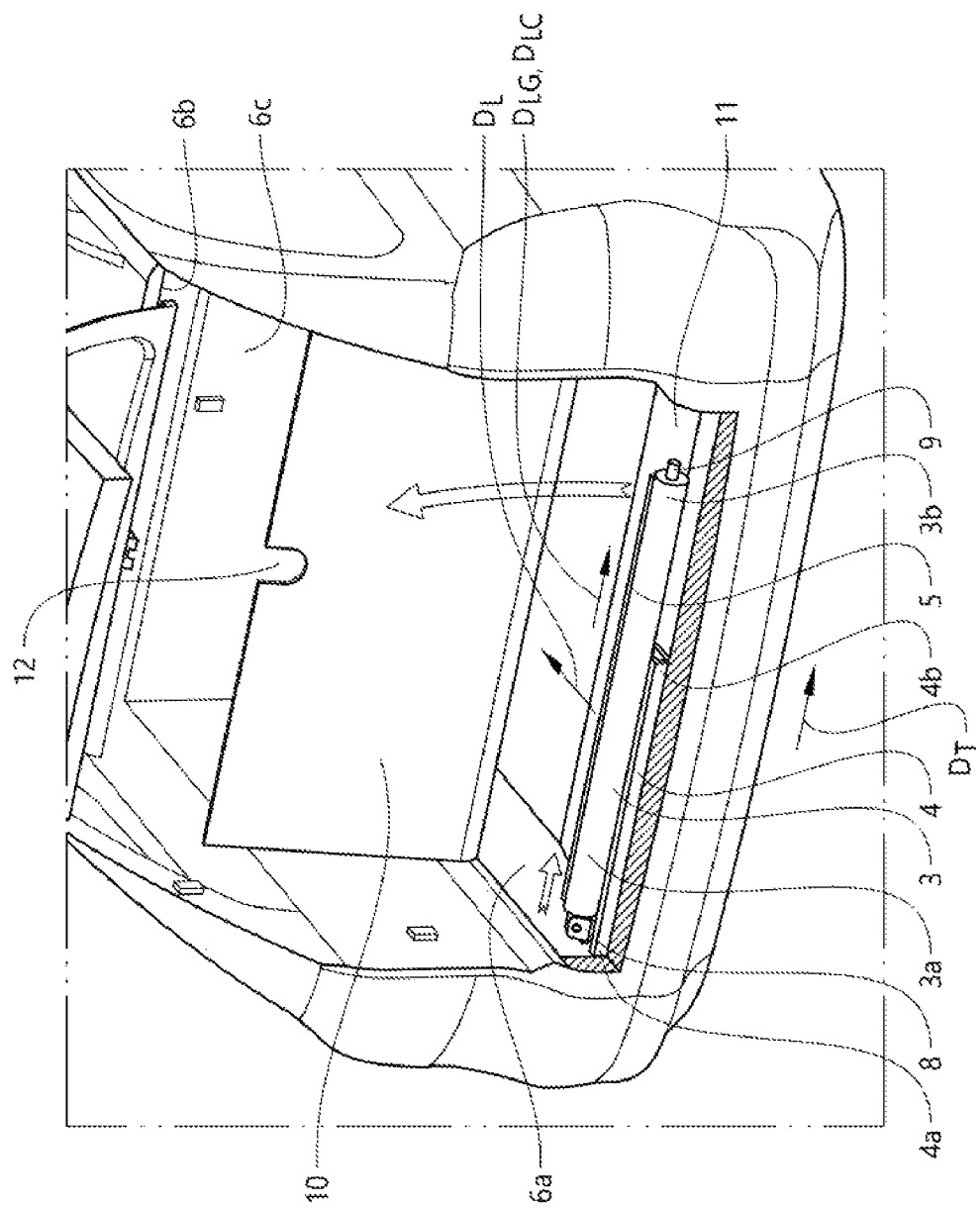
Figure 2C:
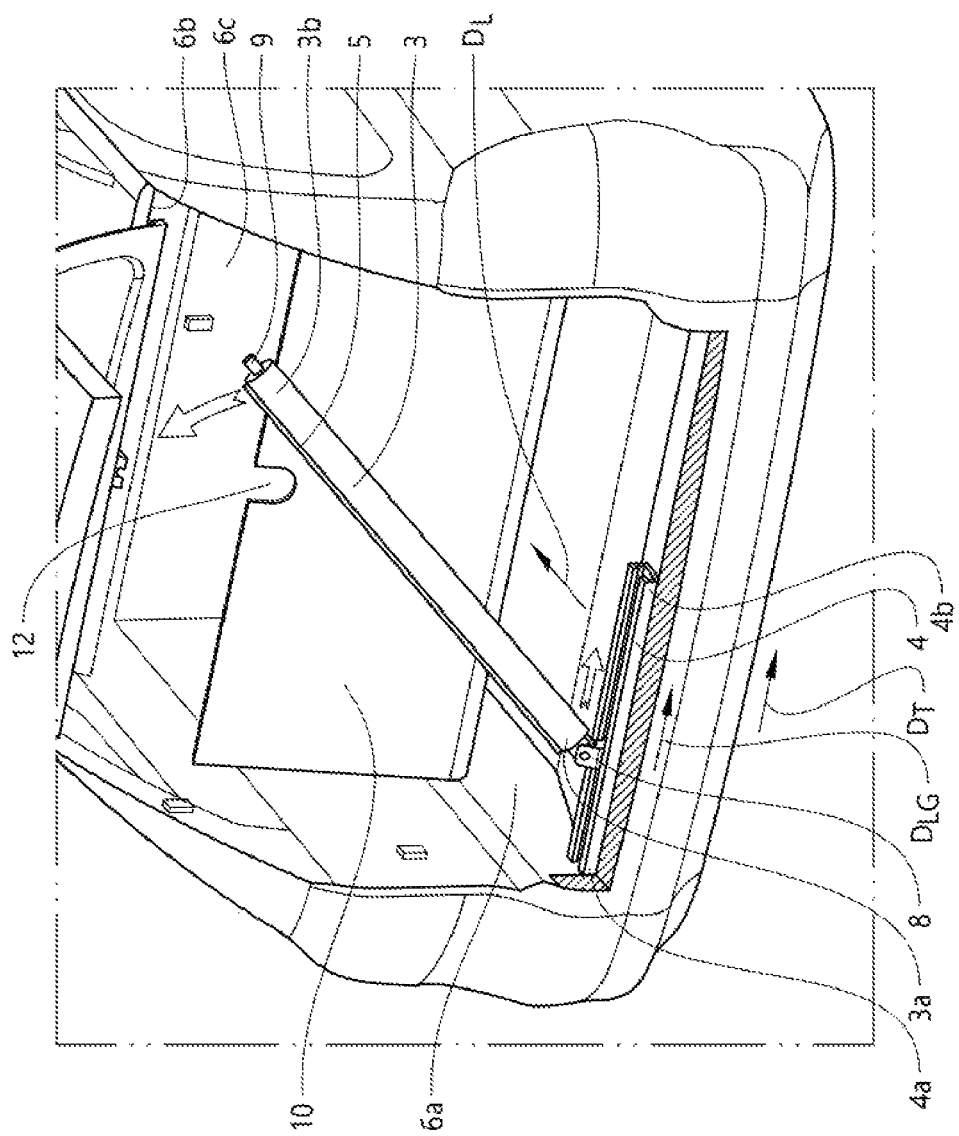
Figure 2D:
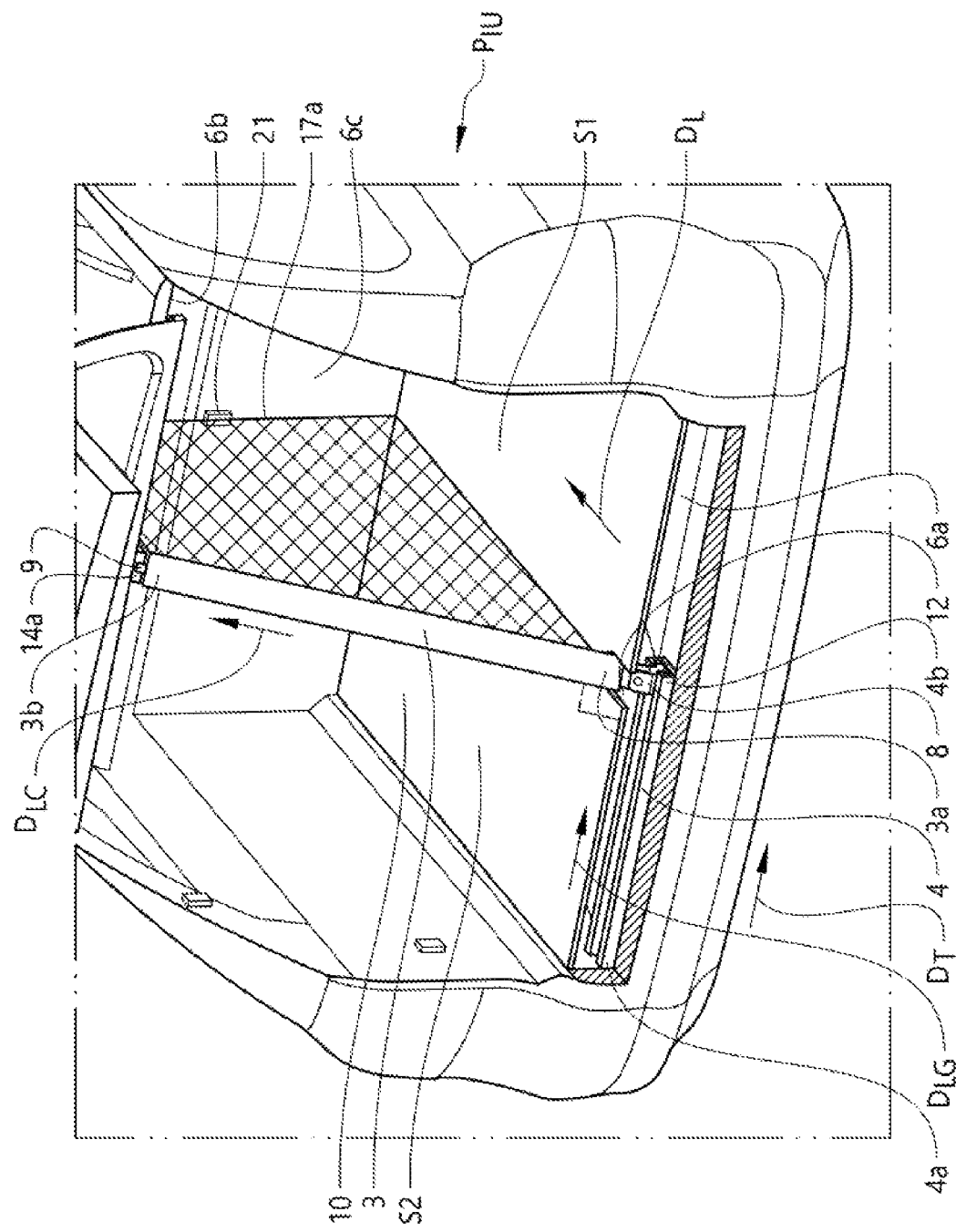

As illustrated in FIGS. 1A-1B and 2A-2D, the cage system 1 comprises a cage post 3, an elongated guide member 4, and a net structure 5. In FIGS. 1A-1B, the elongated guide member 4 is arranged below a movable cargo floor structure 10. Movable cargo floor structures are commonly used in vehicle applications as an upper floor structure of the luggage compartment 2, and a storage area or a spare wheel may for example be arranged on a lower floor structure of the luggage compartment 2 below the movable cargo floor structure 10. When the movable cargo floor structure 10 is in an open position, as shown in FIG. 2B, a user may have access to the area below the movable cargo floor 10, and in a lowered closed position, as shown in FIGS. 2A and 2D, the movable cargo floor 10 is arranged for holding articles or goods transported in the vehicle. The movable cargo floor structure 10 may be suitably hinged at a front section or mid-section for pivotal movement between the open position and the closed position.

The net structure 5 is connected to the cage post 3, and a first end 3a of the cage post 3 is slidingly and hingedly connected to the elongated guide member 4. With this connection between the cage post 3 and the elongated guide member 4, the first end 3a is arranged to slide along the elongated guide member 4 between different positions. Further, the cage post 3 is arranged to be pivoted in relation to the elongated guide member 4 through the hinged connection, as will be further described below.

The elongated guide member 4 is configured to be connected to a first vehicle interior structure 6a. The elongated guide member 4 may for example be attached to the first vehicle interior structure 6a with suitable brackets and fastening elements. The first vehicle interior structure 6a may be any suitable structure, and in the embodiment shown in FIGS. 2A-2D, the first vehicle interior structure 6a is an interior luggage compartment lower floor structure. The cage post 3 and the net structure 5 are movably arranged in relation to the elongated guide member 4 between a storage position $P_{ST}$, as illustrated in FIG. 2A, and an in-use position $P_{IU}$, as illustrated in FIG. 2D. In FIGS. 2B-2C, the cage post 3 with the net structure 5 is arranged in intermediate positions between the storage position $P_{ST}$ and the in-use position $P_{IU}$. A second end 3b of the cage post 3 is in the in-use position $P_{IU}$ configured to be attached to a second vehicle interior structure 6b. The second vehicle interior structure 6b may be any suitable structure, and in the embodiment shown in FIGS. 1A-1B and 2A-2D, the second vehicle interior structure 6b is an interior ceiling structure. The second vehicle interior structure 6b may be arranged with a suitable receiving member 14a for holding the second end 3b of the cage post 3 in position in relation to the second vehicle interior structure 6b.

The cage post 3 has, as shown in the figures, a single post configuration. With a single post configuration is meant that the cage post 3 is arranged as a post structure with an extension between the first end 3a and the second end 3b. The cage post 3 is thus having a single post configuration, where the cage post is extending as a single structure between the first end 3a and the second end 3b. The cage post is according to the disclosure arranged as a single structural element, such as a post having an elongated pole-like or rod-like structure. The single structural element may be made from one structural part or from two or more structural parts attached to each other forming the single structural element extending between the first end 3a and the second end 3b, and may have any suitable shape or configuration depending on the design of the foldable vehicle cage system 1. With this arrangement, the cage post 3 is in the in-use position $P_{IU}$ extending as a single structure between the first vehicle interior structure 6a via the elongated guide member 4 and the second vehicle interior structure 6b, as for example shown in FIG. 2D. In the in-use position, the cage post 3 with its single post configuration is only connected with two attachment points to the vehicle, a first attachment point to the first vehicle interior structure 6a via the elongated guide member 4 and a second attachment point to the second vehicle interior structure 6b. In the illustrated embodiments, the cage post 3 is arranged as an extended elongated post structure having a straight shape. However, the cage post 3 may instead be arranged with a curved shape, irregular shape, or any other suitable shape or configuration.

Figure 3A:
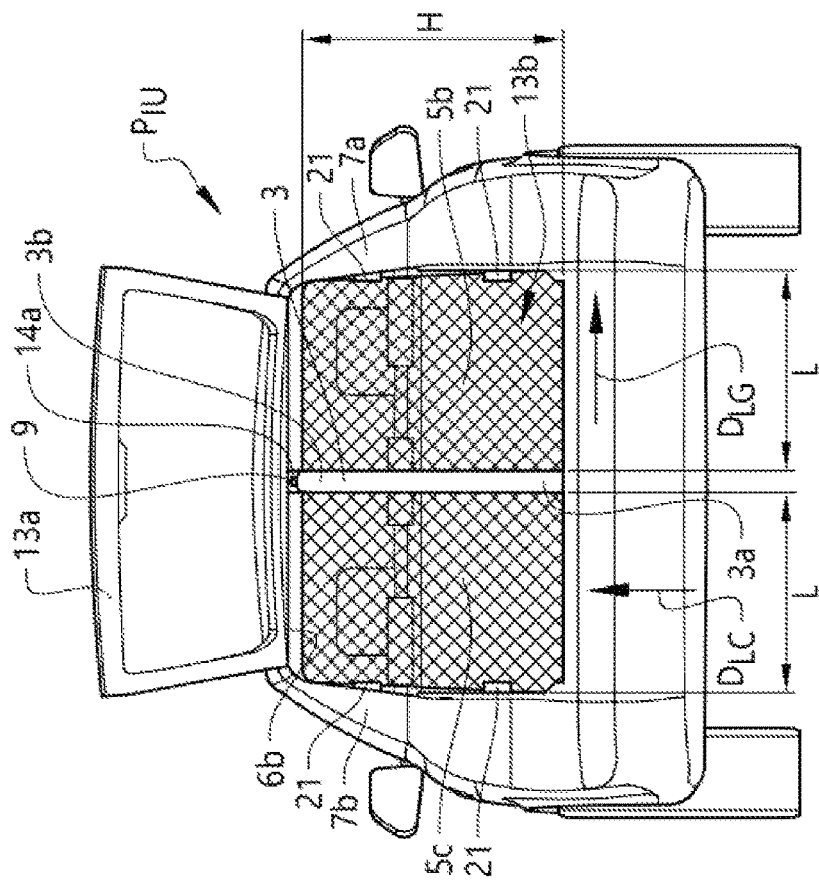
FIGS. 3A-3B show schematically in rear views, the vehicle with the foldable vehicle cage system according to the disclosure.
Figure 3B:
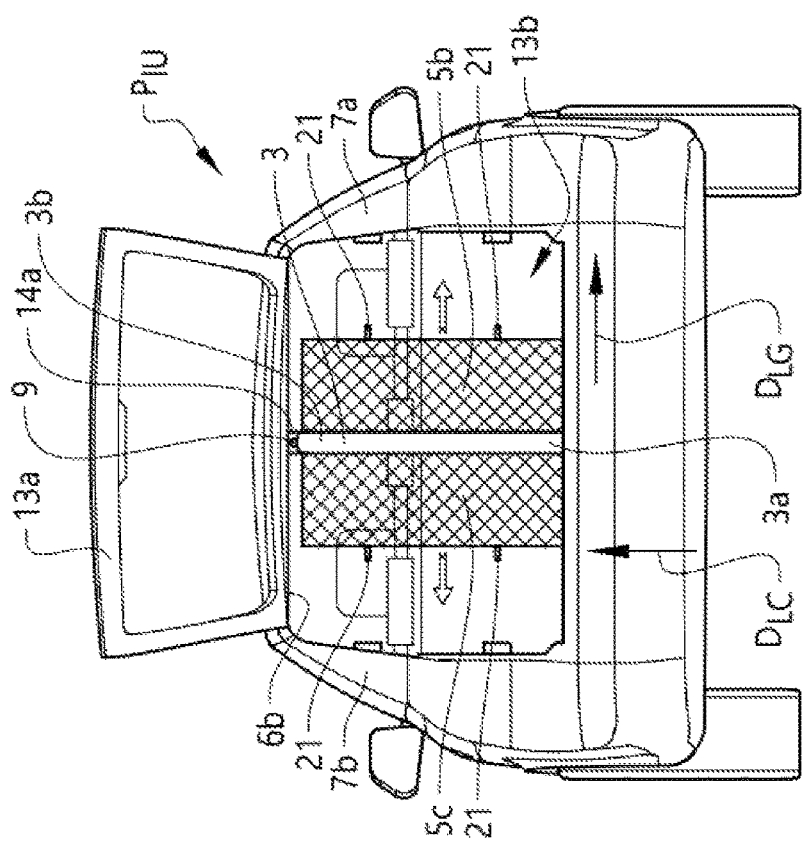

As illustrated in FIG. 2B, the cage post 3 is in the storage position $P_S$ arranged substantially in parallel with a longitudinal direction $D_{LG}$ of the elongated guide member 4. The parallel arrangement is providing a compact configuration for storing the cage system 1. As illustrated in FIGS. 2D and 3A-3B, a longitudinal direction $D_{LC}$ of the cage post 3 is in the in-use position $P_{IU}$ arranged substantially perpendicular to the longitudinal direction $D_{LG}$ of the elongated guide member 4. In the in-use position $P_{IU}$, the cage post 3 is in a position where the net structure 5 can be extended from the cage post 3 for sectioning the luggage compartment 2.

The net structure 5 is in the in-use position $P_{IU}$ configured to be arranged in an extended state. In the extended state, the net structure 5 is extending from the cage post to 3 to one or more suitable interior vehicle structures, depending on the design and construction of the net structure 5. The net structure 5 is in the storage position $P_{ST}$ configured to be arranged in a retracted state. In the retracted state, the net structure 5 is not extending from the cage post 3. The net structure may for example have a rolled-up or folded configuration in the retracted state. The net structure 5 has suitably an elongated shape in the retracted state and the net structure 5 is arranged in parallel with the longitudinal direction $D_{LC}$ of the cage post 3 in the storage position $P_{ST}$, as illustrated in FIG. 2B.

In the embodiments shown in FIGS. 1B, 2D, 5D-5E, 6A-6C, and 7A-7H, the net structure 5 comprises a first net section 5a, where the first net section 5a in the in-use position $P_{IU}$ is configured to be arranged in an extended state between the cage post 3 and a third vehicle interior structure 6c. The third vehicle interior structure 6c may be any suitable structure inside the vehicle to which the first net section 5a can be extended from the cage post 3. Thus, in the extended state, the first net section 5a is extending between the cage post 3 and the third vehicle interior structure 6c. An outer edge 17a of the first net section 5a is attached to the third vehicle interior structure 6c with suitable fastening members 21, such as for example hooks, snap fasteners, toggles, or carabineers. The outer edge 17a of the first net section 5a may also be arranged with a rod or similar structure that can be attached to an opening or receiving member in the third vehicle interior structure 6c. In the shown embodiments, the first net section 5a is in the in-use position $P_{IU}$ configured to extend in a longitudinal vehicle direction $D_L$ between the cage post 3 and the third vehicle interior structure 6c, and with this arrangement of the first net section 5a, the luggage compartment 2 is sectioned into the first storage section S1 and the second storage section S2. The first storage section S1 and a second storage section S2 are arranged laterally on each side of the first net structure 5a and the luggage compartment is sectioned into two storage sections for transporting pets or goods. The third vehicle interior structure 6c may for example be a backrest of a rear vehicle seat 16 and/or the third vehicle interior structure 6c may be a receiving member 14b arranged in connection to a second interior ceiling structure, as illustrated in FIGS. 5A-5E, or alternatively another suitable interior vehicle structure. The first net section 5a is in the storage position $P_{ST}$ configured to be arranged in a retracted state in connection to the cage post 3, as shown in FIGS. 2A-2B.

In a further embodiment, the net structure 5 comprises a second net section 5b, as shown in FIGS. 1B, 3A-3B, 6B, 7B-7E, and 7G-7H. In the in-use position $P_{IU}$, the second net section 5b is configured to extend in a transverse vehicle direction DT between the cage post 3 and a first interior rear vehicle side 7a. The second net section 5b is in the storage position $P_{ST}$ configured to be arranged in connection to the cage post 3 in a retracted state, where the second net section 5b may be arranged in a rolled-up or folded configuration. The first interior rear vehicle side 7a may for example be an interior side structure arranged in connection to a rear car body pillar extending between the roof structure and a lower part of the car body, or any other suitable interior structure to which the second net section can be attached. An outer edge 17b of the second net section 5b is attached to the first interior rear vehicle side 7a with suitable fastening members 21, such as for example hooks, snap fasteners, toggles, or carabineers. The outer edge 17b of the second net section 5b may also be arranged with a rod or similar structure that can be attached to the first interior rear vehicle side 7a.

The net structure 5 may further comprise a third net section 5c in an alternative embodiment, as illustrated in FIGS. 3A-3B, 6C, 7C, 7E, and 7H. The third net section 5c is in the in-use position $P_{IU}$ configured to extend in a transverse vehicle direction DT between the cage post 3 and a second interior rear vehicle side 7b. The third net section 5c is in the storage position $P_{ST}$ configured to be arranged in connection to the cage post 3 in a retracted state, where the third net section 5c may be arranged in a rolled-up or folded configuration. The second interior rear vehicle side 7b may for example be an interior side structure arranged in connection to a rear car body pillar extending between the roof structure and a lower part of the car body, or any other suitable interior structure to which the third net section can be attached. An outer edge 17c of the third net section 5c is attached to the second interior rear vehicle side 7b with suitable fastening members 21, such as for example hooks, snap fasteners, toggles, or carabineers. The outer edge 17c of the third net section 5c may also be arranged with a rod or similar structure that can be attached to the second interior rear vehicle side 7b.

The first end 3a of the cage post 3 comprises a hinged connection member 8, and the hinged connection member 8 is connected to the elongated guide member 4, as illustrated in FIGS. 2A-2D. The cage post 3 is configured to pivot in relation to the elongated guide member 4 via the hinged connection member 8 when moving between the storage position $P_{ST}$, shown in FIG. 2A, and the in-use position $P_{IU}$, shown in FIG. 2D. The hinged connection member 8 is movably connected to the elongated guide member 4, as shown in FIGS. 2A-2D and 4A-4B. The hinged connection member 8 is further arranged to slide along the elongated guide member 4 between the storage position $P_S$ and the in-use position $P_{IU}$. As illustrated in FIGS. 2A-2D, the elongated guide member 4 comprises a first end section 4a and a second end section 4b. The hinged connection member 8 is arranged to slide along the elongated guide member 4 from the first end section 4a of the elongated guide member 4 in a direction towards the second end section 4b of the elongated guide member 4 when the cage post 3 is moved from the storage position $P_S$ to the in-use position $P_{IU}$, as indicated with arrows in FIGS. 2B-2C. In a similar way, the hinged connection member 8 is arranged to slide along the elongated guide member 4 from the second end section 4b of the elongated guide member 4 in a direction towards the first end section 4a of the elongated guide member 4 when the cage post 3 is moved from the in-use position $P_{IU}$ to the storage position $P_S$. Through the hinged connection member 8, the cage post 3 can be pivoted in relation to the elongated guide member 4, as described above. In the in-use position Pay the cage post 3 is arranged in an upright configuration, and in the storage position $P_S$ the cage post 3 is arranged in a folded configuration, as shown in FIGS. 2A-2D. Thus, the pivoting function is allowing the cage post 3 to be pivoted between the substantially parallel configuration to the longitudinal direction $D_{LG}$ of the elongated guide member 4 in the storage position $P_S$, and the substantially perpendicular configuration to the longitudinal direction $D_{LG}$ of the elongated guide member 4 in the in-use position $P_{IU}$.

Figure 4B:
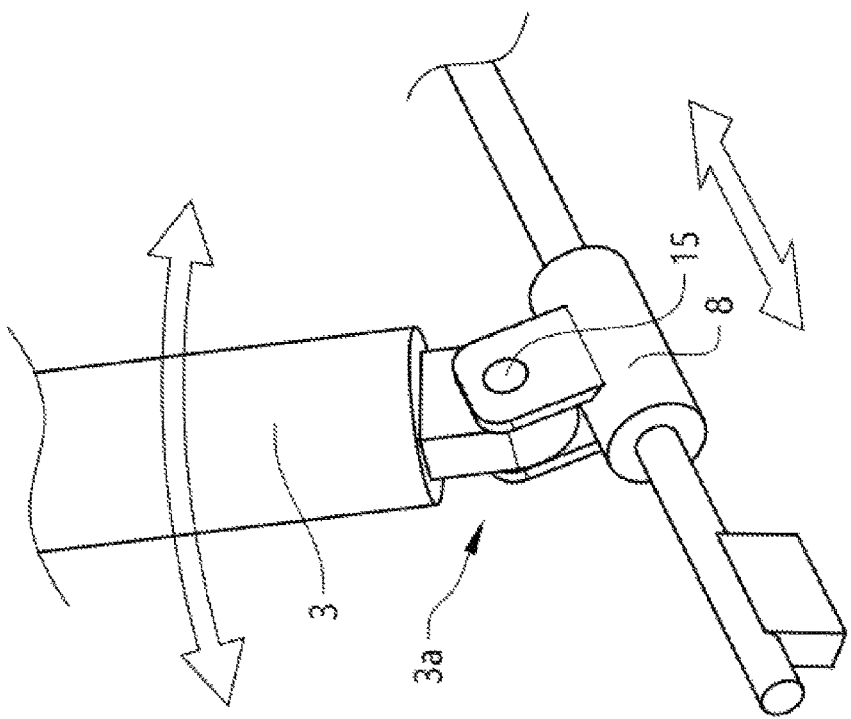
FIGS. 4A-4B show schematically in perspective views, alternative embodiments of parts of the foldable vehicle cage system according to the disclosure.
Figure 4A:
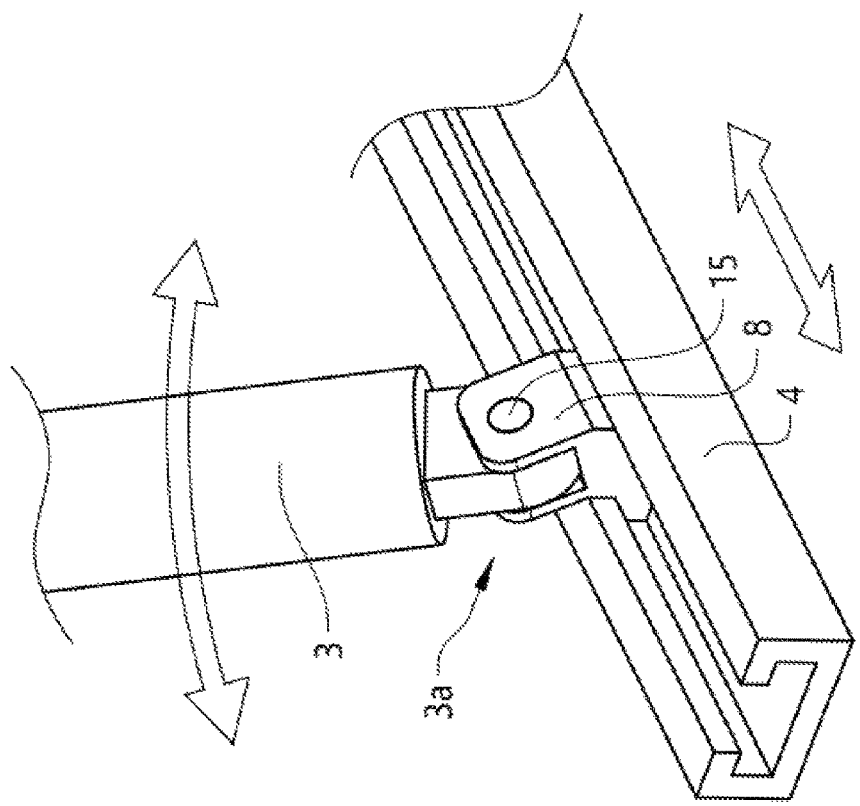

In an example embodiment, the elongated guide member 4 may be arranged as an elongated rod structure to which the hinged connection member 8 is slidingly attached. The hinged connection member 8 may, as shown in FIG. 4B, be designed as a sleeve structure encompassing the rod structure, where the sleeve structure is arranged to slide along the rod structure. The cage post 3 may be pivotally attached to the sleeve structure at the first end 3a with a hinged part having a hinge axis 15 about which the cage post 3 may pivot in relation to the elongated guide member 4. In an alternative embodiment, the elongated guide member 4 may be arranged as an elongated track structure to which the hinged connection member 8 is slidingly attached. The hinged connection member 8 may, as shown in FIG. 4A, be designed as a sliding member arranged in the track structure, where the sliding member is arranged to slide along the track structure. The cage post 3 may be pivotally attached to the sleeve structure at the first end 3a with a hinged part having a hinge axis 15 about which the cage post may pivot in relation to the elongated guide member 4. The elongated guide member 4 and/or the hinged connection member 8 may if desired be provided with fastening means or similar arrangements for positioning the hinged connection member 8 in relation to the elongated guide member 4.

The second end 3b of the cage post 3 comprises a connection member 9, and the connection member 9 in the in-use position $P_{IU}$ is arranged to be attached to the second vehicle interior structure 6b. As described above, the second vehicle interior structure 6b may be arranged with the receiving member 14a for holding the second end 3b of the cage post 3 in position in relation to the second vehicle interior structure 6b. The receiving member 14a and the connection member 9 may be arranged to interact with each other for holding the cage post 3 in position in relation to the second vehicle interior structure 6b. As an example, the connection member may be a shaped structural end part of the cage post 3 arranged to be releasably connected to the receiving member 14a. The receiving member 14a and/or the connection member 9 may suitably be provided with snap fasteners or similar arrangements for holding the cage post 3 in position in relation to the second vehicle interior structure 6b.

The foldable vehicle cage system further comprises the movable cargo floor structure 10. The movable cargo floor structure 10 may be hinged at a front section or mid-section for pivotal movement between the open position and the closed position, as described above and illustrated in FIGS. 2A-2B and 5A-5B. A storage compartment 11 may be arranged below the movable cargo floor structure 10, wherein the cage post 3 and the net structure 5 in the storage position $P_S$ can be arranged in the storage compartment 11 below the movable cargo floor structure 10. With this arrangement, the cage post 3 and the net structure 5 can conveniently be hidden below the movable cargo floor structure 10 when the cage system is not used.

The movable cargo floor structure 10 may be arranged with a recess 12, as illustrated in FIGS. 1A-1B, 2A-2D, and 6A-6C, where the recess 12 is configured to be arranged at least partly around the cage post 3 and the net structure 5 in the in-use position $P_{IU}$. The recess 12 may have a shape similar to the cross-sectional shape of the cage post 3, wherein the recess 12 is locking the cage post 3 and preventing movement of the cage post 3 in relation to the elongated guide member 4 in the in-use position $P_{IU}$, as will be further described below. The recess 12 may be covered with a lid, flexible sheet of material, or other suitable structure in the storage position $P_S$.

Figure 5E:
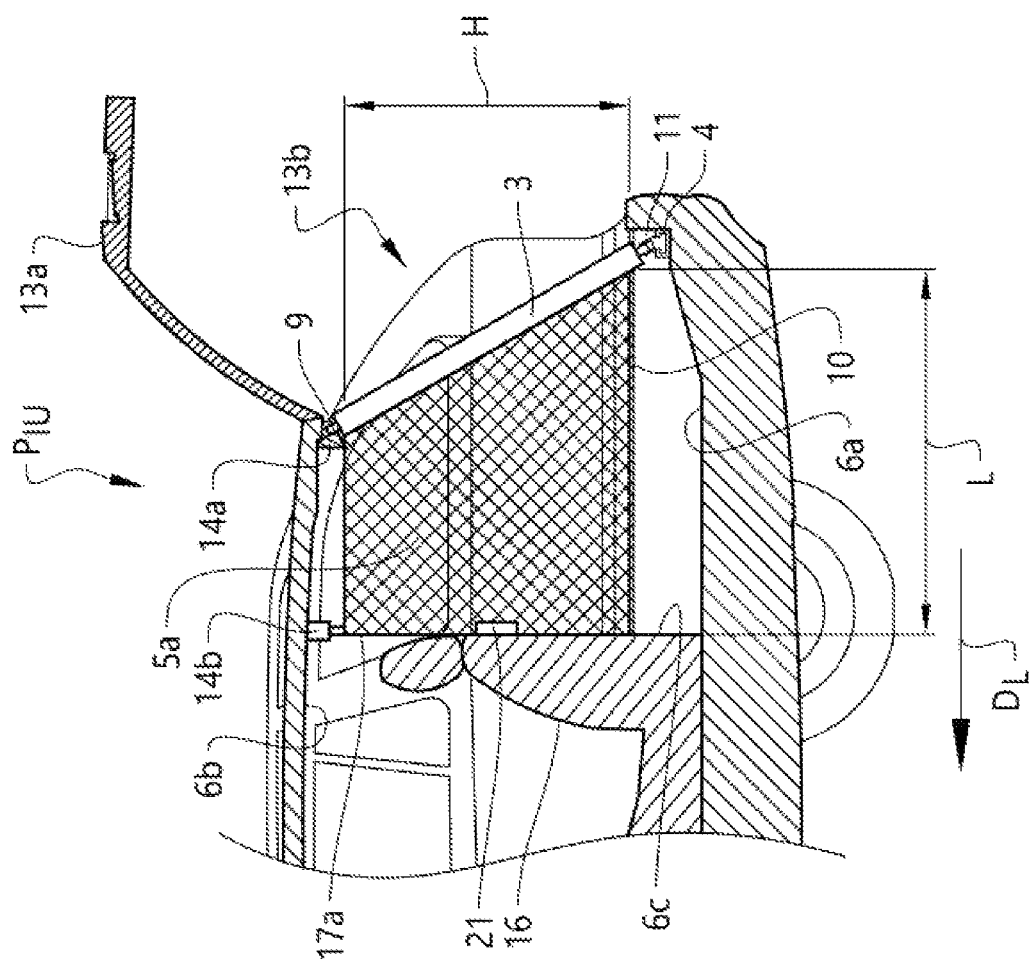
Figure 6C:
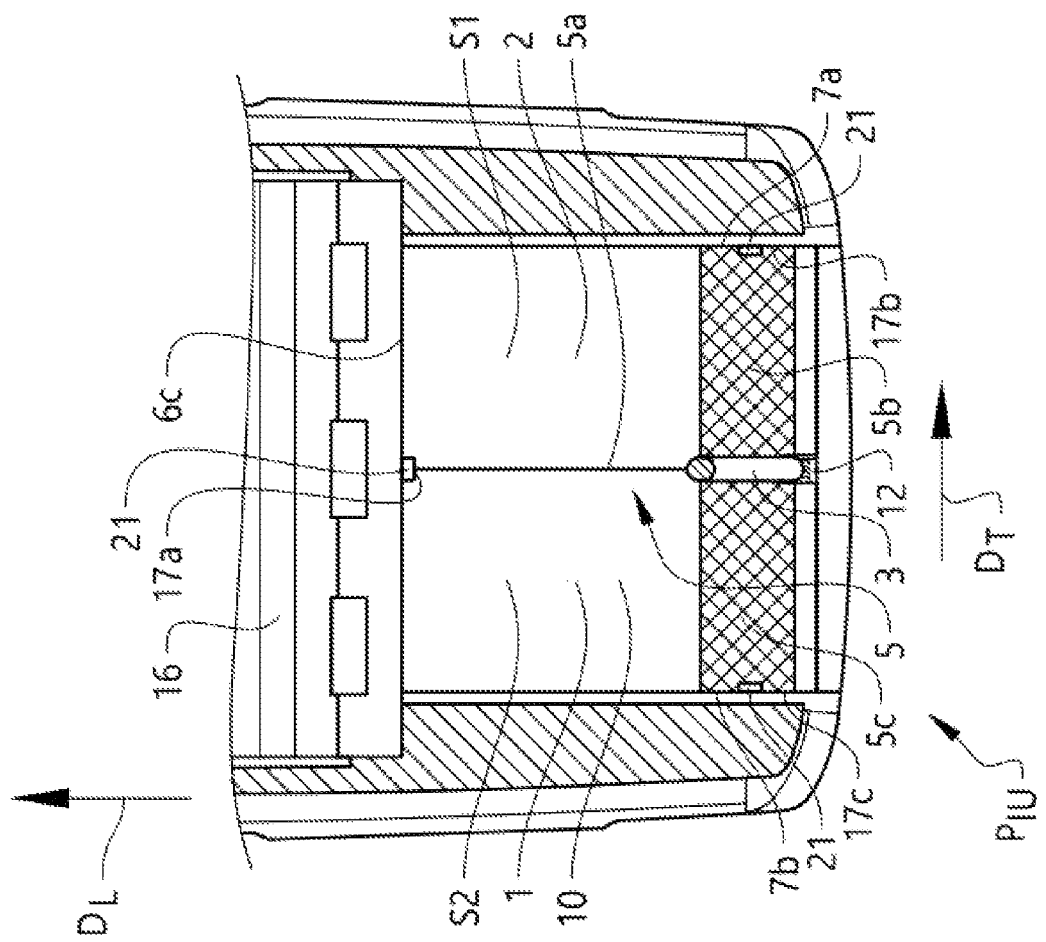

As shown in the illustrated embodiment, the net structure 5 with the net sections may in the in-use position $P_{IU}$ extend between the interior ceiling of the vehicle and the movable cargo floor structure 10 in a vertical vehicle direction $D_V$, to secure that the luggage compartment 2 is thoroughly sectioned between the movable cargo floor structure 10 and the vehicle ceiling. This may prevent a pet or goods from moving between the first storage section S1 and the second storage section S2. The net structure with the net sections may for example extend all the way between the movable cargo floor structure and the inner ceiling, or alternatively, the net structure 5 with the net sections may have a different extension in the vertical vehicle direction $D_V$ if desired. Each net section may have a height H extending in the vertical direction, as illustrated in FIGS. 3B and 5E and the height H may vary depending on the design of the net structure. Further, each net section may have a length L extending between the cage post 3 and the interior structure of the vehicle to which the outer edge of the net section is attached, as illustrated in FIGS. 3B and 5E. The net structure 5 with the net sections may be made of any suitable flexible net material, such as for example plastic materials or composite materials. Flexible metallic materials may also be used if desired. The cage post 3, the elongated guide member 4, and the hinged connection member 8 may be made of metal structures, such as for example aluminium, plastic materials, composite structures, or a combination of different materials.

In one embodiment, the net structure 5 may in the storage position $P_S$ at least partly be arranged inside the cage post 3 in a retracted rolled-up configuration, as illustrated in FIGS.

7A-7E, where a cross-sectional view of the cage post is shown in a view from above. The interior structure of the cage post 3 may be provided with a suitable roll-up mechanism 18 to which the net structure is attached. The roll-up mechanism 18 is allowing the net structure to be extended from and retracted into the cage post 3. In the in-use position $P_{IU}$ the net structure 5 is arranged in an extended configuration from the cage post 3. When pulling the net structure 5 out from the cage post 3, the net structure 5 is unwounded from the roll-up mechanism 18, and further the net structure 5 can be wound up onto the roll-up mechanism 18 when not used. The roll-up mechanism 18 may be any type of conventional mechanism, such as for example a spring-loaded mechanism.

Figure 7A:
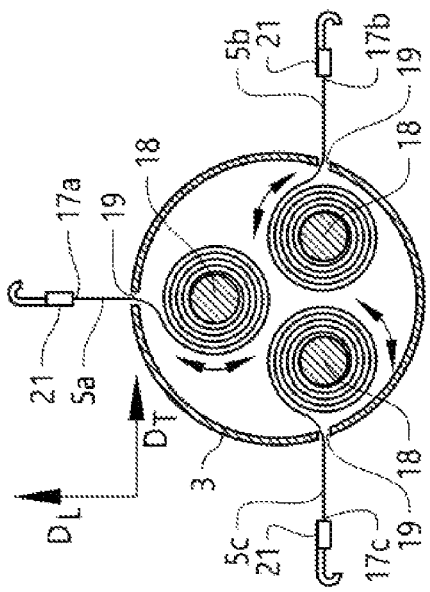
FIGS. 7A-7H show schematically in cross-sectional views from above, alternative embodiments of a cage post and net structure according to the disclosure.

In the embodiment shown in FIG. 7A, the cage post 3 is provided with a single roll-up mechanism 18 for the net structure 5, where the net structure 5 comprises a first net section 5a arranged on the roll-up mechanism 18. The cage post 3 is provided with a slot 19, through which the first net section 5a is arranged. The outer side edge 17a of the first net section is provided with a suitable fastening member 21 for attaching the net structure 5 to the interior of the vehicle.

Figure 7B:
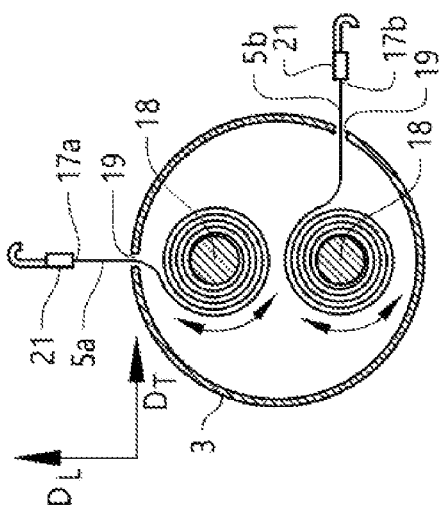

In the embodiment shown in FIG. 7B, the net structure 5 comprises a first net section 5a and a second net section 5b. In this embodiment, the cage post 3 is provided with two roll-up mechanisms 18. The first net section 5a and the second net section 5b are each arranged on a separate roll-up mechanism 18, wherein the respective net sections can be extended and retracted independently of each other. The cage post 3 is provided with two slots 19, through which the first net section 5a and the second net section 5b are arranged. It would also be possible to have only one common slot 19 for both net sections in the cage post 3 as an alternative embodiment. The outer side edges 17a,17b of the net sections are provided with suitable fastening members 21 for attaching the net structure 5 to the interior of the vehicle.

Figure 7C:
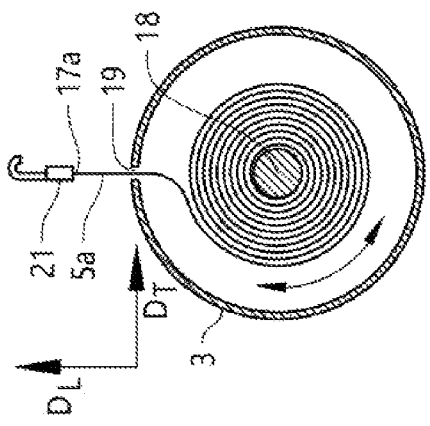

In the embodiment shown in FIG. 7C, the net structure 5 comprises a first net section 5a, a second net section 5b, and a third net section 5c. In this embodiment, the cage post 3 is provided with three roll-up mechanisms 18. The first net section 5a, the second net section 5b, and the third net section 5c are each arranged on a separate roll-up mechanism 18, wherein the respective net sections can be extended and retracted independently of each other. The cage post 3 is provided with three slots 19, through which the first net section 5a, the second net section 5b, and the third net section 5c are arranged. It would also be possible to have only one common slot 19 for all net sections in the cage post 3, or two slots 19, as alternative embodiments. The outer side edges 17a,17b,17c of the net sections are provided with suitable fastening members 21 for attaching the net structure 5 to the interior of the vehicle.

Figure 7D:
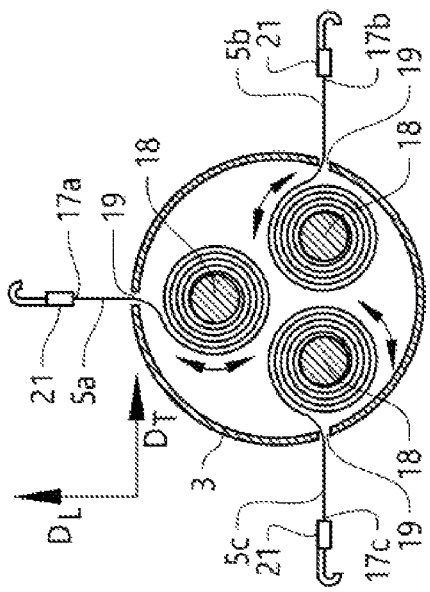

In the embodiment shown in FIG. 7D, the cage post 3 is provided with a single roll-up mechanism 18 for the net structure 5, where the net structure 5 comprises a first net section 5a and a second net section 5b arranged on the roll-up mechanism 18. As shown in the figure, the second net section 5b is attached to the first net section 5a, and the respective net sections may be provided with magnets 20, or other fasteners, for holding the net sections in position when rolled-up. The cage post 3 is provided with a slot 19, through which the sections are arranged. The outer side edges 17a, 17b of the respective net sections are provided with suitable fastening members 21 for attaching the net structure 5 to the interior of the vehicle.

Figure 7E:
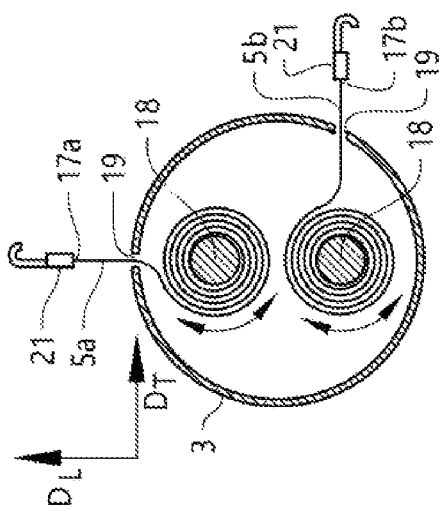

In the embodiment shown in FIG. 7E, the cage post 3 is provided with a single roll-up mechanism 18 for the net structure 5, where the net structure 5 comprises a first net section 5a, a second net section 5b, and a third net section 5c arranged on the roll-up mechanism 18. As shown in the figure, the second net section 5b and the third net section are attached to the first net section 5a, and the respective net sections may be provided with magnets 20 for holding the net sections in position when rolled-up. The cage post 3 is provided with a slot 19, through which the sections are arranged. The outer side edges 17a,17b,17c of the respective net sections are provided with suitable fastening members 21 for attaching the net structure 5 to the interior of the vehicle.

Figure 7F:
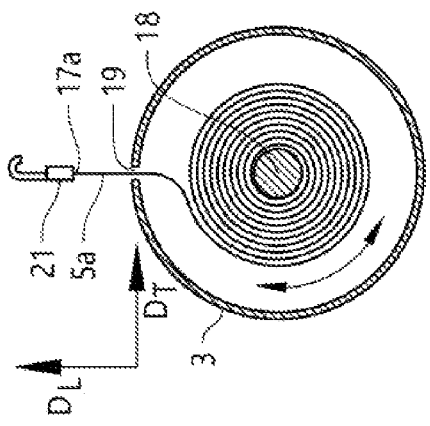
Figure 7H:
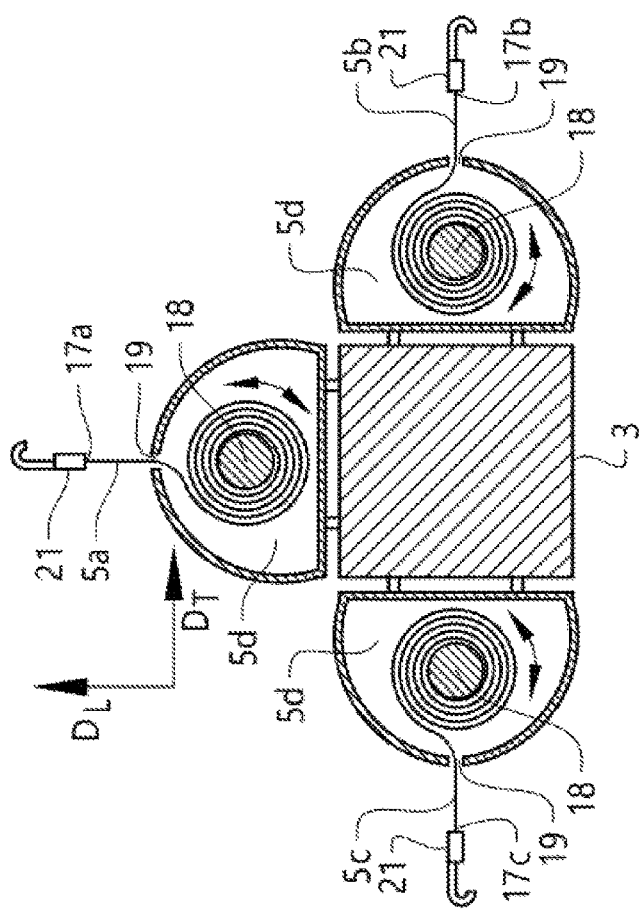
Figure 7G:
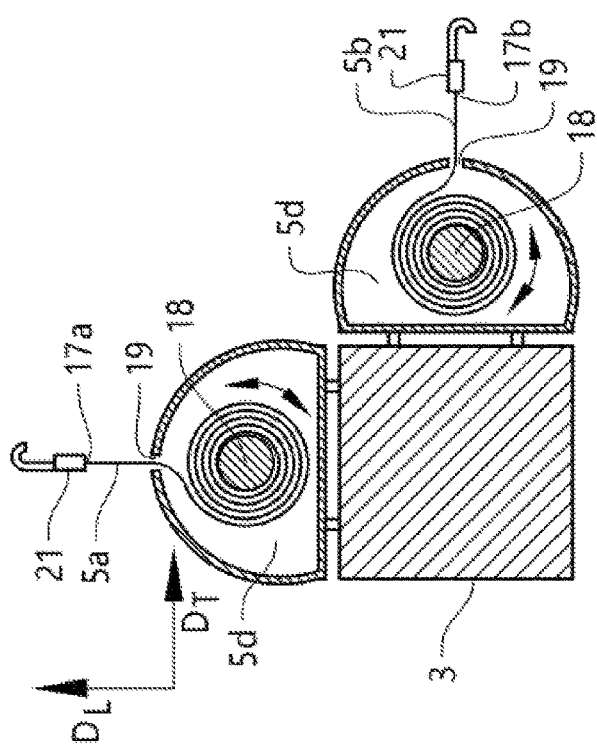

In alternative embodiments illustrated in FIGS. 7F-7H, the net structure 5 further comprises at least one net compartment 5d attached to the cage post 3. The net structure 5 in the storage position $P_S$ is arranged inside the at least one net compartment 5d in a retracted rolled-up configuration, and in the in-use position $P_{IU}$ is arranged in an extended configuration from the net compartment 5d. The at least one net compartment 5d may be removably attached to the cage post 3 with suitable fastening means.

In the embodiment shown in FIG. 7F, the cage post 3 is provided with a single net compartment 5d for the net structure 5, where the net structure 5 comprises a first net section 5a arranged on a roll-up mechanism 18 inside the net compartment 5d. The net compartment 5d is provided with a slot 19, through which the first net section 5a is arranged. The outer side edge 17a of the first net section is provided with a suitable fastening member 21 for attaching the net structure 5 to the interior of the vehicle.

In the embodiment shown in FIG. 7G, the net structure 5 comprises a first net section 5a and a second net section 5b. In this embodiment, the cage post 3 is provided with two net compartments 5d comprising roll-up mechanisms 18 for the net sections. The first net section 5a and the second net section 5b are each arranged on a roll-up mechanism 18 in a separate net compartment 5d, wherein the respective net sections can be extended and retracted independently of each other. The net compartments 5d are each provided with a slot 19, through which the respective net sections are arranged. The outer side edges 17a,17b of the respective net sections are provided with suitable fastening members 21 for attaching the net structure 5 to the interior of the vehicle. In an alternative embodiment, it would instead of having two net compartments be possible to arrange a single net compartment on the cage post 3, where the net compartment comprises two roll-up mechanisms with a construction similar to the cage post configuration shown in FIG. 7B.

In the embodiment shown in FIG. 7H, the net structure 5 comprises a first net section 5a, a second net section 5b, and a third net section 5c. In this embodiment, the cage post 3 is provided with three net compartments 5d comprising roll-up mechanisms 18 for the net sections. The first net section 5a, the second net section 5b, and the third net section 5c are each arranged on a roll-up mechanism 18 in a separate net compartment 5d, wherein the respective net sections can be extended and retracted independently of each other. The net compartments 5d are each provided with a slot 19, through which the respective net sections are arranged. The outer side edges 17a,17b,17c of the respective net sections are provided with suitable fastening members 21 for attaching the net structure 5 to the interior of the vehicle. In an alternative embodiment, it would instead of having three net compartments be possible to arrange a single net compartment on the cage post 3, where the net compartment comprises three roll-up mechanisms with a construction similar to the cage post configuration shown in FIG. 7C. In a further alternative embodiment, the cage post 3 may be provided with two net compartments 5d, where one net section is arranged in one net compartment and two net sections in the other net compartment.

It would also be possible to arrange the cage post 3 with four or more net sections, where the net sections are arranged inside the cage post, or alternatively arrange the cage post 3 with any desired number of net compartments for four or more net sections.

As described above, the vehicle comprises a first vehicle interior structure 6a, a second vehicle interior structure 6b, and a third vehicle interior structure 6c. The foldable vehicle cage system may be arranged in different positions of the vehicle. A suitable positioning of the system is shown in the example embodiment in the figures, where the first vehicle interior structure 6a is a luggage compartment floor structure. The elongated guide member 4 is in this embodiment attached to the luggage compartment floor structure arranged below the movable cargo floor structure 10. The second vehicle interior structure 6b is in this embodiment a first interior ceiling structure comprising the receiving member 14a. The first interior ceiling structure is a part of the interior vehicle ceiling arranged at a rear part of the vehicle above the luggage compartment floor structure and the movable cargo floor structure 10. The third vehicle interior structure 6c is in this embodiment a backrest structure of a rear vehicle seat 16 and/or a second interior ceiling structure. The second interior ceiling structure is a part of the interior vehicle ceiling arranged forward of the first interior ceiling structure in the longitudinal vehicle direction $D_L$, suitably above the backrest structure. Thus, when the cage system is in the in-use position, the third vehicle interior structure 6c is an interior vehicle component arranged forward of the cage post 3 in the longitudinal vehicle direction $D_L$.

To operate the foldable vehicle cage system 1, a user of the vehicle may first open the tailgate 13a from a closed position to an open position as illustrated in FIGS. 5A-5B, to access to the luggage compartment 2 via the tailgate opening 13b. Thereafter the movable cargo floor structure 10 is moved from the lowered closed position to the open position for the user to have access to the area below the movable cargo floor structure 10 where the foldable vehicle cage system 1 is arranged with the cage post 3 in the storage position $P_S$, as illustrated in FIG. 5A. The cage post 3 is then pivoted in relation to the elongated guide member 4 via the hinged connection member 8 from the storage position $P_S$ and simultaneously moved in a sliding motion along the elongated guide member 4, wherein the hinged connection member 8 is sliding along the elongated guide member 4 from the first end section 4a of the elongated guide member 4 in a direction towards the second end section 4b of the elongated guide member 4, as illustrated in FIGS. 2B-2C and 5B. When the hinged connection member 8 has reached a position close to the second end section 4b, the cage post 3 is raised into the in-use position $P_{IU}$ and connected to the receiving member 14a of the second vehicle interior structure 6b, as shown in FIG. 5C, together with lowering the movable cargo floor structure 10 into the closed position. The recess 12 is encompassing and locking the cage post 3 when the movable cargo floor structure 10 is arranged in the closed position preventing the cage post 3 from moving along the elongated guide member 4, as shown in FIGS. 1A and 2D. When the cage post 3 is secured in the in-use position $P_{IU}$ with the recess 12 and the receiving member 14a, the respective one or more net sections can be pulled out from the cage post 3 or from the one or more net compartments 5d and attached to respective interior structures of the vehicle.

To remove the foldable vehicle cage system 1, the system is operated in the reverse order. The one or more net sections are unfastened from the interior vehicle structures and retracted into the cage post 3 or the one or more net compartments 5d. The movable cargo floor structure 10 is moved into the open position, and the cage post 3 is moved and pivoted in relation to the elongated guide member 4 from the in-use position $P_{IU}$ to the storage position $P_S$, wherein the cage post 3 is pivoted in relation to the elongated guide member 4 via the hinged connection member 8 and the hinged connection member 8 is sliding along the elongated guide member 4 from the second end section 4b of the elongated guide member 4 in a direction towards the first end section 4a of the elongated guide member 4. The movable cargo floor structure 10 can be moved to the closed position when the cage post 3 is arranged in the storage position $P_S$.

It should be understood that the net sections are having shapes suitable for being attached to the interior of the vehicle and shapes suitable for extending between the cage post 3 and the interior of the vehicle. The shapes of the net sections may vary between different net sections and different types of vehicles, depending on the vehicle and luggage compartment designs. Further, the vehicle may alternatively be provided with two or more foldable vehicle cage systems 1.

Further, it would be possible to arrange the cage post 3 detachable from the elongated guide member 4, wherein the cage post 3 can be stored in alternative positions in the vehicle.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle cage system
2: Vehicle luggage compartment
3: Cage post
3a: First end, Cage post
3b: Second end, Cage post
4: Elongated guide member
5: Net structure
5a: First net section
5b: Second net section
5c: Third net section 5d: Net compartment
6a: First vehicle interior structure
6b: Second vehicle interior structure
6c: Third vehicle interior structure
7a: First interior rear vehicle side
7b: Second interior rear vehicle side
8: Hinged connection member
9: Connection member
10: Movable cargo floor structure
11: Storage compartment
12: Recess
13a: Tailgate
13b: Tailgate opening
14a: Receiving member, Second vehicle interior structure
14b: Receiving member, Third vehicle interior structure
15: Hinge axis
16: Rear vehicle seat
17a: Outer side edge, First net section
17b: Outer side edge, Second net section
17c: Outer side edge, Third net section
18: Roll-up mechanism
19: Slot
20: Magnet
21: Fastening member

What is claimed is:

1. A foldable vehicle cage system arranged for sectioning an interior vehicle luggage compartment, wherein the cage system comprises a cage post, an elongated guide member, and a net structure, wherein the net structure is connected to the cage post, a first end of the cage post is slidingly and hingedly connected to the elongated guide member, and the elongated guide member is configured to be connected to a first vehicle interior structure,
    wherein the cage post and the net structure are movably arranged in relation to the elongated guide member between a storage position and an in-use position,
    wherein a second end of the cage post in the in-use position is configured to be attached to a second vehicle interior structure, and
    wherein the system further comprises a movable cargo floor structure, wherein the cage post and the net structure in the storage position are arranged in a storage compartment below the movable cargo floor structure.

2. The foldable vehicle cage system according to claim 1, wherein the cage post has a single post configuration with a post structure extending between the first end and the second end.

3. The foldable vehicle cage system according to claim 1, wherein the cage post in the storage position is arranged substantially in parallel with a longitudinal direction of the elongated guide member.

4. The foldable vehicle cage system according to claim 1, wherein the cage post in the in-use position is arranged substantially perpendicular to a longitudinal direction of the elongated guide member.

5. The foldable vehicle cage system according to claim 1, wherein the net structure in the in-use position is configured to be arranged in an extended state, and wherein the net structure in the storage position is configured to be arranged in a retracted state.

6. The foldable vehicle cage system according to claim 5, wherein the net structure has an elongated shape in the retracted state and wherein the net structure is arranged in parallel with a longitudinal direction of the cage post in the storage position.

7. A foldable vehicle cage system arranged for sectioning an interior vehicle luggage compartment, wherein the cage system comprises a cage post, an elongated guide member, and a net structure, wherein the net structure is connected to the cage post, a first end of the cage post is slidingly and hingedly connected to the elongated guide member, and the elongated guide member is configured to be connected to a first vehicle interior structure,
    wherein the cage post and the net structure are movably arranged in relation to the elongated guide member between a storage position and an in-use position,
    wherein a second end of the cage post in the in-use position is configured to be attached to a second vehicle interior structure, and
    wherein the net structure comprises a first net section, wherein the first net section in the in-use position is configured to be arranged in an extended state between the cage post and a third vehicle interior structure, and wherein the first net section in the storage position is configured to be arranged in a retracted state in connection to the cage post.

8. The foldable vehicle cage system according to claim 7, wherein the first net section in the in-use position is configured to extend in a longitudinal vehicle direction between the cage post and the third vehicle interior structure.

9. The foldable vehicle cage system according to claim 7, wherein the net structure further comprises a second net section, wherein the second net section in the in-use position is configured to extend in a transverse vehicle direction between the cage post and a first interior rear vehicle side, and wherein the second net section in the storage position is configured to be arranged in connection to the cage post.

10. The foldable vehicle cage system according to claim 9, wherein the net structure further comprises a third net section, wherein the third net section in the in-use position is configured to extend in a transverse vehicle direction between the cage post and a second interior rear vehicle side, and wherein the third net section in the storage position is configured to be arranged in connection to the cage post.

11. The foldable vehicle cage system according to claim 1, wherein the first end of the cage post comprises a hinged connection member, wherein the hinged connection member is connected to the elongated guide member, wherein the cage post is configured to pivot in relation to the elongated guide member via the hinged connection member when moving between the storage position and the in-use position.

12. The foldable vehicle cage system according to claim 11, wherein the hinged connection member is movably connected to the elongated guide member and arranged to slide along the elongated guide member between the storage position and the in-use position.

13. The foldable vehicle cage system according to claim 11, wherein the hinged connection member is arranged to slide along the elongated guide member from a first end section of the elongated guide member in a direction towards a second end section of the elongated guide member when the cage post is moved from the storage position to the in-use position, wherein the hinged connection member is arranged to slide along the elongated guide member from the second end section of the elongated guide member in a direction towards the first end section of the elongated guide member when the cage post is moved from the in-use position to the storage position.

14. The foldable vehicle cage system according to claim 1, wherein the second end of the cage post comprises a connection member, wherein the connection member in the in-use position is arranged to be attached to the second vehicle interior structure.

15. The foldable vehicle cage system according to claim 1, wherein the cage post in the in-use position is arranged in an upright configuration, and in the storage position is arranged in a folded configuration.

16. The foldable vehicle cage system according to claim 1, wherein the movable cargo floor structure comprises a recess, wherein the recess is configured to be arranged at least partly around the cage post in the in-use position for preventing movement of the cage post in relation to the elongated guide member.

17. The foldable vehicle cage system according to claim 1, wherein the net structure in the in-use position extends between the second vehicle interior structure and the movable cargo floor structure.

18. The foldable vehicle cage system according to claim 1, wherein the net structure in the storage position at least partly is arranged inside the cage post in a retracted rolled-up configuration, and in the in-use position is arranged in an extended configuration from the cage post.

19. The foldable vehicle cage system according to claim 1, wherein the net structure further comprises at least one net compartment attached to the cage post, wherein the net structure in the storage position is arranged inside the at least one net compartment in a retracted rolled-up configuration, and in the in-use position is arranged in an extended configuration from the net compartment.

20. The foldable vehicle cage system according to claim 19, wherein the at least one net compartment is removably attached to the cage post.

21. A vehicle comprising a foldable vehicle cage system according to claim 1, wherein the vehicle comprises the first vehicle interior structure, the second vehicle interior structure, and a third vehicle interior structure, wherein the first vehicle interior structure is a luggage compartment floor structure, the second vehicle interior structure is a first interior ceiling structure, and the third vehicle interior structure is a backrest structure and/or a second interior ceiling structure.

* * * * *